July 25, 1933.  C. L. PFEIFFER  1,919,802
APPARATUS FOR TESTING INSULATION
Filed Sept. 25, 1929
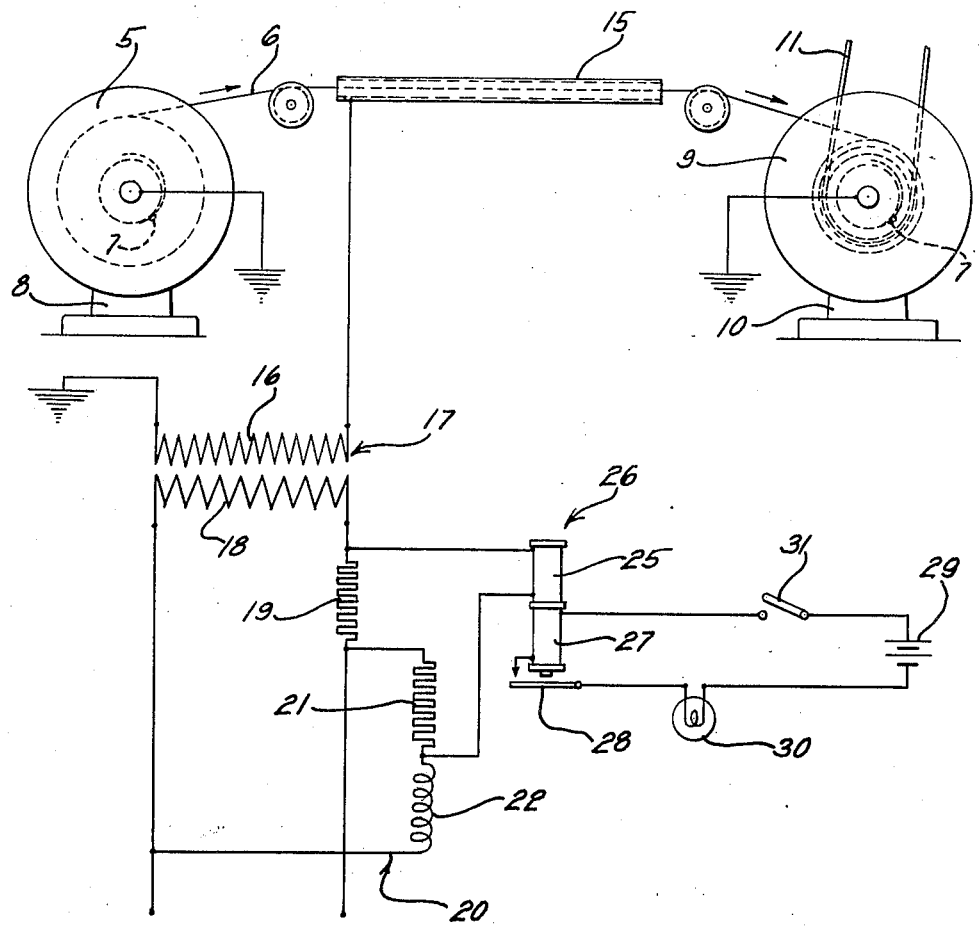
Inventor
Conrad L. Pfeiffer
By H. A. Pattison Att'y.

Patented July 25, 1933

1,919,802

UNITED STATES PATENT OFFICE

CONRAD L. PFEIFFER, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR TESTING INSULATION

Application filed September 25, 1929. Serial No. 394,937.

This invention relates to apparatus for testing insulation, and more particularly insulation on electrical conductors.

The principal object of the invention is the provision of an efficient and simple apparatus for rapidly testing insulation to determine imperfections therein.

One embodiment of the invention contemplates the provision of a simple apparatus whereby the method of testing insulation may be practiced, in which an insulated electrical conductor having its ends grounded on a supply reel and take-up reel, respectively, is passed through a metal tube connected to a terminal of a high potential transformer, the other terminal thereof being grounded. The primary winding of the transformer is electrically connected with an indicating device whereby equal and opposite potentials are impressed on the terminals of the device so that no current flows therethrough when the insulation under test is satisfactory, but when a defective portion of the insulation passes into the tube, the equipotentiality is disturbed and an operating current traverses the indicating device to cause its operation.

Further objects and advantages of the invention will become apparent from the following detailed description when taken in conjunction with the accompanying drawing, in which The single figure of the drawing discloses diagrammatically an apparatus embodying the invention by means of which the method of testing may, be practiced.

Referring now to the drawing, the numeral 5 designates a reel having a supply of rubber covered wire 6 which has its innermost end free from insulation connected by a screw 7 to the reel. The reel is grounded through its support 8 on which it is rotatably mounted. The other end of the wire is similarly connected to a take-up reel 9 rotatably mounted on a grounded support 10 and rotated by a belt 11 driven by any suitable means (not shown).

As shown in the drawing, the rubber covered wire passes through a metal tube 15 which is connected to a terminal of a secondary winding 16 of a high potential transformer 17, the other terminal thereof being grounded. The primary winding 18 of the transformer is connected to any suitable source of alternating electrical energy through a series non-inductive resistance 19. Connected in parallel with the primary winding 18 and the resistance 19 is a circuit 20 comprising a non-inductive resistance 21 in series with an induction coil 22, the latter having the same value of impedance as the primary winding 18. The resistance 21 is equal in value to the resistance 19 and is connected in the circuit so that the potential drops across the resistances oppose each other. Between the resistance 21 and the coil 22 of the circuit 20 is connected one end of a winding 25 of an electromagnet 26, while the other end of the winding is connected to the primary circuit of the transformer 17 at a point between the resistance 19 and the primary winding 18. The electromagnet 26 is also provided with another winding 27 which, when an armature 28 of the electromagnet is actuated, establishes a locking circuit from battery 29 through lamp 30, armature 28, winding 27, and a switch 31 to battery.

In operating the apparatus, the inner end of an insulated wire, such as a rubber covered wire, is electrically connected to the supply reel and the outer end thereof is passed through the tube and fastened to the grounded take-up reel. With the transformer connected to the source of alternating electrical energy, the switch 31 is closed and the take-up reel rotated. As long as the insulation on the wire traveling through the tube is satisfactory, the secondary circuit of the transformer will not be completed from the tube through the wire and the reels to ground, and the small no-load magnetizing current passing through the primary of the transformer produces a potential drop across the resistance 19 which is vectorially opposite the drop across the resistance 21 so that no operating current will flow through the electromagnet. However, when a defective portion of insulation passes into the tube, the dielectric strength thereof is not sufficient to withstand a high potential and an electric current will bridge the gap between the tube and the wire to complete the secondary circuit of the transformer through ground. This breakdown of the insulation results in an increase of current through the primary circuit of the transformer and increases the voltage drop across the resistance 19, resulting in the operation of the electromagnet and the lighting of the lamp 30 to notify the operator that the insulation is defective. The operating potential across the electromagnet is then the vector sum of the voltages across the resistances 19 and 21. This operating potential may vary from zero to any desired percentage of the supply voltage and the electromagnet may be adjusted to operate at any desired value. To reset the indicating device the switch 31 is opened to de-energize the electromagnet and then closed when the testing may be continued.

Although the invention is particularly well adapted for use in testing the dielectric strength of the insulation on electrical conductors, it will be understood that the invention is capable of many other modifications and applications without departing from the spirit and scope of the invention as defined by the appended claims.

What is claimed is:

1. In a device for testing insulated wire, a transformer having a primary coil and a secondary coil, a tubular electrode through which the insulated wire passes without contact therewith, the electrode being connected to one terminal of said secondary transformer coil and the other terminal of said coil being connected to the metal of said wire, a balanced Wheatstone bridge composed as to one side thereof of the said transformer primary coil and a first non-inductive resistance in series therewith and composed as to the other side of the said Wheatstone bridge of an induction coil having impedance equal to that of the said primary coil and a second non-inductive resistance in series with the said first non-inductive resistance and electrically equivalent thereto, and detector means forming the bridge circuit of the said Wheatstone bridge.

2. In a device for testing insulated wire, a transformer having a primary coil and a secondary coil, a tubular electrode through which the insulated wire passes without contact therewith, the electrode being connected to one terminal of said secondary transformer coil and the other terminal of said coil being connected to the metal of said wire, a balanced Wheatstone bridge composed as to one side thereof of the said transformer primary coil and a first non-inductive resistance in series therewith and composed as to the other side of the said Wheatstone bridge of an induction coil having impedance equal to that of the said primary coil and a second non-inductive resistance in series with the said first non-inductive resistance and electrically equivalent thereto, a detector circuit including a relay connected across the said Wheatstone bridge as the bridge circuit thereof from a point thereon between the said primary coil and the said first resistance to a point between the said induction coil and the said second resistance, and indicating means operated by the said relay.

3. In a device for testing insulated wire, a transformer having a primary coil and a secondary coil, an electrode adjacent to the path of the wire being tested, the electrode being connected to one terminal of said secondary transformer coil and the other terminal of said coil being connected to the metal of said wire, a Wheatstone bridge composed as to one side thereof of the said transformer primary coil and a first resistance in series therewith and composed as to the other side of the said Wheatstone bridge of an induction coil and a second resistance in series with the said first resistance, and detector means forming the bridge circuit of the said Wheatstone bridge.

CONRAD L. PFEIFFER.